US010528924B2

(12) United States Patent
Schwartz (10) Patent No.: US 10,528,924 B2
(45) Date of Patent: Jan. 7, 2020

(54) SELF-AWARE TOKEN (71) Applicant: International Business Machines Corporation, Armonk, NY (US)

(72) Inventor: Robyn R. Schwartz, Chicago, IL (US)

(73) Assignee: International Business Machines Corporation, Armonk, NY (US)

(*) Notice: Subject to any disclaimer, the term of this patent is extended or adjusted under 35 U.S.C. 154(b) by 1647 days.

(21) Appl. No.: 14/087,462

(22) Filed: Nov. 22, 2013

(65) Prior Publication Data

US 2015/0149343 A1 May 28, 2015

(51) Int. Cl.
*G06Q 20/06* (2012.01)
*G07F 7/12* (2006.01)

(52) U.S. Cl.
CPC .......... *G06Q 20/065* (2013.01); *G07F 7/125* (2013.01)

(58) Field of Classification Search
None
See application file for complete search history.

(56) References Cited

U.S. PATENT DOCUMENTS

| | | | |
|---|---|---|---|
| 6,188,993 B1 | 2/2001 | Eng et al. | |
| 6,446,052 B1 | 9/2002 | Juels | |
| 7,133,846 B1 | 11/2006 | Ginter et al. | |
| 7,363,265 B2 | 4/2008 | Horgan | |
| 7,376,621 B1 | 5/2008 | Ling | |
| 7,590,602 B1 | 9/2009 | Luzzatto | |
| 8,037,193 B2 | 10/2011 | Hay et al. | |
| 2001/0027116 A1 | 10/2001 | Baird | |
| 2003/0070080 A1 | 4/2003 | Rosen | |
| 2003/0149662 A1 | 8/2003 | Shore | |
| 2004/0143501 A1 | 7/2004 | Lopez et al. | |
| 2007/0150413 A1 | 6/2007 | Morgenstern | |
| 2008/0133415 A1 | 6/2008 | Ginter et al. | |
| 2008/0195499 A1* | 8/2008 | Meredith | G06Q 20/06 705/26.3 |
| 2008/0281721 A1* | 11/2008 | Simunovic | G06Q 20/10 705/27.1 |
| 2009/0163278 A1* | 6/2009 | Kawanaka | A63F 13/12 463/40 |

(Continued)

FOREIGN PATENT DOCUMENTS

| | | |
|---|---|---|
| CN | 101069204 A | 11/2007 |
| CN | 103365953 A | 10/2013 |

OTHER PUBLICATIONS

Matonis—CoinDesk launches proprietary Bitcoin Price Index, Sep. 2013, retrieved Feb. 17, 2017.*

(Continued)

*Primary Examiner* — Jay Huang
*Assistant Examiner* — Gabriel Mercado
(74) *Attorney, Agent, or Firm* — Patrick J. Daugherty; Daugherty & Del Zoppo Co., LPA (57) ABSTRACT

A token file is received from an e-Commerce platform having a veracity grade capability. An off-line transaction is made using the token which records events of the transaction. Subsequently, the token re-enters the e-Currency platform and transfers the recorded off-line events. The platform rebuilds the token's past state based upon the state of nearby tokens and the recorded events, so that additional transactions can be rated, including a veracity grade.

14 Claims, 9 Drawing Sheets

(56) References Cited

U.S. PATENT DOCUMENTS

2012/0123924 A1* 5/2012 Rose .............. G06Q 20/12
 705/35
2013/0268539 A1* 10/2013 Yerli .............. G06Q 50/00
 707/748

OTHER PUBLICATIONS

Kucera, Daniell, "Amazon Debuts Virtual Currency for Purchases on Kindle," Bloomberg.com, Feb. 5, 2013, 2 pages.
Amazon Media Room: Press Release, Amazon.com, Introducing Amazon Coins, Feb. 5, 2013, 2 pages.
Emma Hutchings, "Facebook Offers Reusable Gift Card that Holds Balances from Different Retailers," Feb. 1, 2013, 5 pages.
Champlain et al, "Tax Code Determination," U.S. Appl. No. 13/867,654, filed Apr. 22, 2013, 17 pages.

\* cited by examiner

SELF-AWARE TOKEN

BACKGROUND OF THE INVENTION

1. Field of the Invention

The invention relates generally to financial data processing in an e-Currency platform, and more particularly, to processing e-Commerce tokens which have involved off-line transactions.

2. Background

Electronic currencies ("e-Currency") are agreed-upon digital objects and records that may be used for an exchange of goods or services. e-Currencies may provide new degrees of anonymity, control, reach and function to users, and endeavor to meet a wide range of technical and financial requirements. e-Currencies span both privately created currencies and the sovereign currencies of nations, and may include digital representations of physical capital, virtualized currencies, earned or assigned, or achieved values, and virtual currencies. e-Currencies are becoming an important medium of exchange in today's increasingly digitized economies. This is reflected in the proliferation of numerous types of e-Currencies, from organized currency systems such as PayPal™, WebMoney™ and Ven™, to open architecture e-Currency systems such as Bitcoin™ and Ripple™. These are supplemented by a plurality of informal e-Currency systems, such as Microsoft™ X-Box Live™ points, and credits for Facebook™ gaming, such as Facebook™ credits and Zynga™ credits. As consumers begin adopting the use of these new forms of currency, the relative value of these e-Currencies as compared to traditional hard currencies or goods and services will be called into question. Additionally, the inclusion of grass-roots social or privatized currencies and bartering creates questions regarding the ability to validate, authenticate and coordinate transactions across diverse forms of payment and trade that traditionally had little or no interaction.

A platform for tracking and validating e-Currency tokens has been described in U.S. patent application Ser. No. 13/488,553 filed Jun. 5, 2012. The platform provides lifetime tracking of a token, real time transaction support, secure authentication and validation services, and a ranking of veracity based on collected, historical and predictive models.

In the event a user of the platform makes an off-line transaction involving a token from the platform then a system is needed to allow a token to re-appear on-line at a later time and continue to be authenticated, validated, and rated by the platform. It is believed such a system would constitute a significant improvement to the art of financial data processing.

Application Ser. No. 13/488,553 filed Jun. 5, 2012, should be incorporated by reference herein in its entirety.

BRIEF SUMMARY OF THE INVENTION

In one aspect of this disclosure, a computer-implemented method for tracking tokens is disclosed. A plurality of e-Currency token types is defined in memory. A life cycle of a tracked e-Currency token is tracked, the tracked e-Currency token being of an e-Currency token type that is one of the defined plurality of e-Currency token types. The tracking is done by receiving an indication that the tracked e-Currency token has been used in a transaction, and recording a value for the tracked e-Currency token as measured against another asset (not necessarily of common origin) involved in the transaction. Multiple recorded values for the tracked e-Currency token are aggregated. A price of the e-Currency token type is graded based on at least the aggregated recorded values for the tracked e-Currency token.

A user of the computer implemented method may take a token off-line. Subsequently, the user may engage in an off-line transaction involving the token. The off-line transaction may take place in a conventional, physical, brick and mortar store. Alternatively, the off-line transaction may be performed electronically using a workstation or portable device logging on to an independent or stand-alone financial or e-Commerce system which is not connected or in communication with the platform. However, the token is able to re-appear on the platform at a later time using methods and systems described in detail below.

In another aspect of this disclosure, a system for tracking e-Currency tokens is disclosed, comprising a computer processor and memory containing program instructions, wherein the program instructions are executable to cause the computer processor to perform steps. The steps comprise defining in computer memory a plurality of e-Currency token types; and tracking, using the computer processor, a life cycle of a tracked e-Currency token, the tracked e-Currency token being of an e-Currency token type that is one of the defined plurality of e-Currency token types. The tracking comprises receiving an indication that the tracked e-Currency token has been used in a transaction, and recording a value for the tracked e-Currency token as measured against another asset involved in the transaction. Multiple recorded values are aggregated for the tracked e-Currency token. A price of the e-Currency token type is graded based on at least the aggregated recorded values for the tracked e-Currency token.

The system also includes an external memory device(s) acting in collaboration. A token file of a token tracked by the system may be sent to the external memory device. A system user may thereafter engage in an off-line transaction involving the token. Off-line transaction events may be recorded on the external memory device. Later, the past state of the token can be re-built by the system based on the state of nearby tokens in the system and the off-line recorded events using methods described in detail below.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE SEVERAL VIEWS OF THE DRAWINGS

This disclosure is further described in the detailed description that follows, with reference to the drawings, in which.

DETAILED DESCRIPTION

This application discloses an e-Currency Validation and Authorization Services Platform system and method. The e-Currency Validation and Authorization Services Platform enables the tracking of any individual e-Currency unit or "token" from creation to destruction. Tracking the lifecycle of any e-Currency token allows for the authentication and validation of the tracked e-Currency token each time the e-Currency token participates with the e-Currency Validation and Authorization Services Platform (i.e., each time it is used in a recorded transaction). Preferably, information regarding the e-Currency token type, the underlying asset exchanged, value, transactor identities, etc. is collected each time a token is used to perform a transaction. The information created by this tracking is then used in a variety of ways, including (but not limited to) those set forth below.

First, the ability to validate and authenticate digital tokens across the lifetime of any particular token will bolster trust and viability, allowing e-Currencies to operate across disparate economic systems, fostering easier participating alongside sovereign currencies and other non-standard currencies.

Second, the information set collected by the tracking process presents an opportunity to view a value of the token by leveraging the information set. The token tracking information may be aggregated with token tracking information from other tokens of the same e-Currency type. This may allow generation of an average estimated value of the e-Currency type, which may enable an administrator to adjudge the accuracy of quoted market values for the e-Currency type.

Third, aggregated information on a variety of e-Currency types, as valued against other traditional currencies or other tangible assets, may provide relativistic estimates of reported e-Currency values against other traditional currencies or tangible assets, enabling wider use of e-Currency as a general medium of exchange rather than limiting e-Currency to specific niches or "walled garden" environments, as they are now.

Fourth, participants and users to critically assess and determine allowance/permission of at-hand transactions. Other financial patterns may be identified in the data, allowing an administrator to (for example) adjudge the veracity or existence of a claimed e-Currency token.

Fifth, e-Currency Validation and Authorization Services Platform system and method may allow disparate enterprises and organizations to share information while maintaining compliance with any mandates or governing rules on information sharing as imposed by participating governing bodies. Similarly, the e-Currency Validation and Authorization Services Platform system and method may be leveraged to enforce the mandates and standards of accredited bodies or sovereign entities.

Sixth, the Currency Validation and Authorization Services Platform 100 may also facilitate trade between disparate currencies in support of seamless execution of transactions across disparate currencies.

The information may be used in many other ways relevant to the above stated goals. For example, patterns in the data, combined with historical information for a particular transactor, may allow an administrator to adjudge the trustworthiness or reliability of the transactor. That may be useful both from the perspective of other transactors who might conduct transactions with the transactor in question, or in determining the reliability of an e-Currency value provided by the transactor in question. The system may therefore enable verification of e-Currency tokens, estimates on the accuracy of quoted e-Currency prices, and easy cross comparison of value between disparate types of assets (such as traditional currencies, e-Currencies, hard assets, privatized currencies, etc.) in disparate types of transactions (such as standard retail, "IOU" arrangements, or even bartering).

Figure 1:
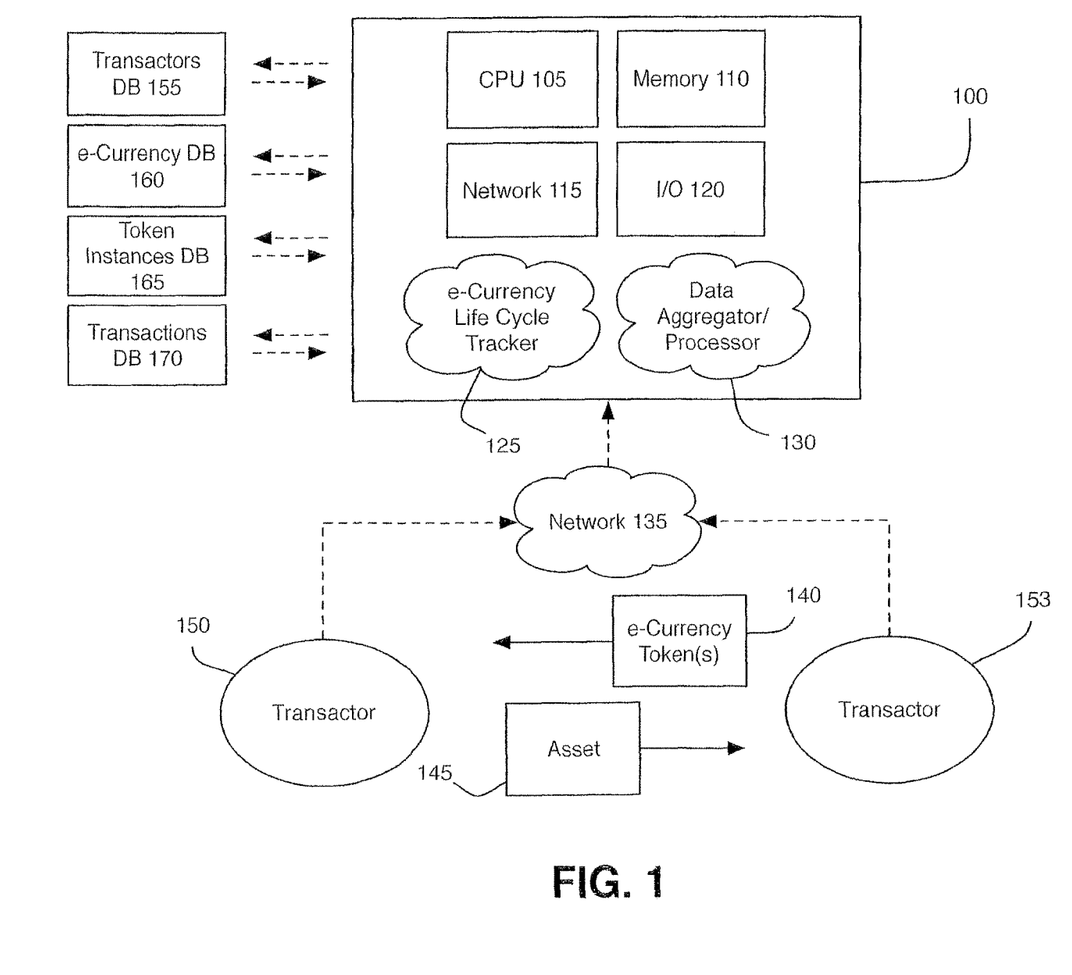
FIG. 1 is a high level representation of an illustrative e-Currency Validation and Authorization Services Platform.

FIG. 1 is a high-level representation of an illustrative e-Currency Validation and Authorization Services Platform 100. It should be appreciated that FIG. 1 provides only an illustration of one implementation and does not imply any limitations with regard to the environments in which different embodiments may be implemented. Many modifications to the depicted environments may be made based on design and implementation requirements.

The e-Currency Validation and Authorization Services Platform 100 is representative of any electronic device capable of executing machine-readable program instructions. The e-Currency Validation and Authorization Services Platform 100 may be representative of a computer system or other electronic devices. Examples of computing systems, environments, and/or configurations that may represented by The e-Currency Validation and Authorization Services Platform 100 include (but are not limited to) personal computer systems, server computer systems, thin clients, thick clients, laptop devices, smart phones, multiprocessor systems, microprocessor-based systems, network PCs, minicomputer systems, and distributed cloud computing environments that include any of the above systems or devices.

The e-Currency Validation and Authorization Services Platform 100 preferably includes a central processing unit ("CPU") 105, memory 110, network device 115 and input/output device 120. The CPU 105 receives and executes program instructions. Memory 110 may be provided for both long term and short term memory (i.e., random access memory), and provide data storage for the CPU 105. Memory 110 may also include both internal to Platform 100 and external memory devices. The external devices may be removable and portable such as, but not limited to, a semiconductor based thumb drive, an RFID device, a portable computing device, or a smart phone. Network device 115 may provide connectivity to a network 135, which may be, for example, an intranet, extranet or the Internet. Input/output device 130 may provide accessibility for human operators, including devices such as keyboards, mice, displays, touch screens, etc. Software processes e-Currency Life Cycle Tracker 125 and the Data Aggregator/Processor 130 may operate on the e-Currency Validation and Authorization Services Platform 100. The e-Currency Life Cycle Tracker 125 and the Data Aggregator/Processor 130 may be separate software processes or they may be implemented within the same software process.

The e-Currency Validation and Authorization Services Platform 100 is preferably in communication with data stores Transactors DB 155, e-Currency DB 160, Token Instances DB 165 and Transactions DB 170. Transactors DB 155 preferably stores identifying information for every transactor that partakes in the e-Currency Validation and Authorization Services Platform 100. E-Currency DB 160 preferably stores identifying information for every e-Currency type registered with the e-Currency Validation and Authorization Services Platform 100. Token Instances DB 165 preferably stores identifying information for every unique e-Currency token that has been reported to the e-Currency Validation and Authorization Services Platform 100. The Transactions DB 170 preferably stores information on every transaction that has been reported to the e-Currency Validation and Authorization Services Platform 100. Transactors DB 155, e-Currency DB 160, Token Instances DB 165 and Transactions DB 170 may be implemented as separate data stores, or they may all be integrated as a single data store. For example, they may simply be separate but interrelated tables on a traditional table-based database store.

Figure 2:
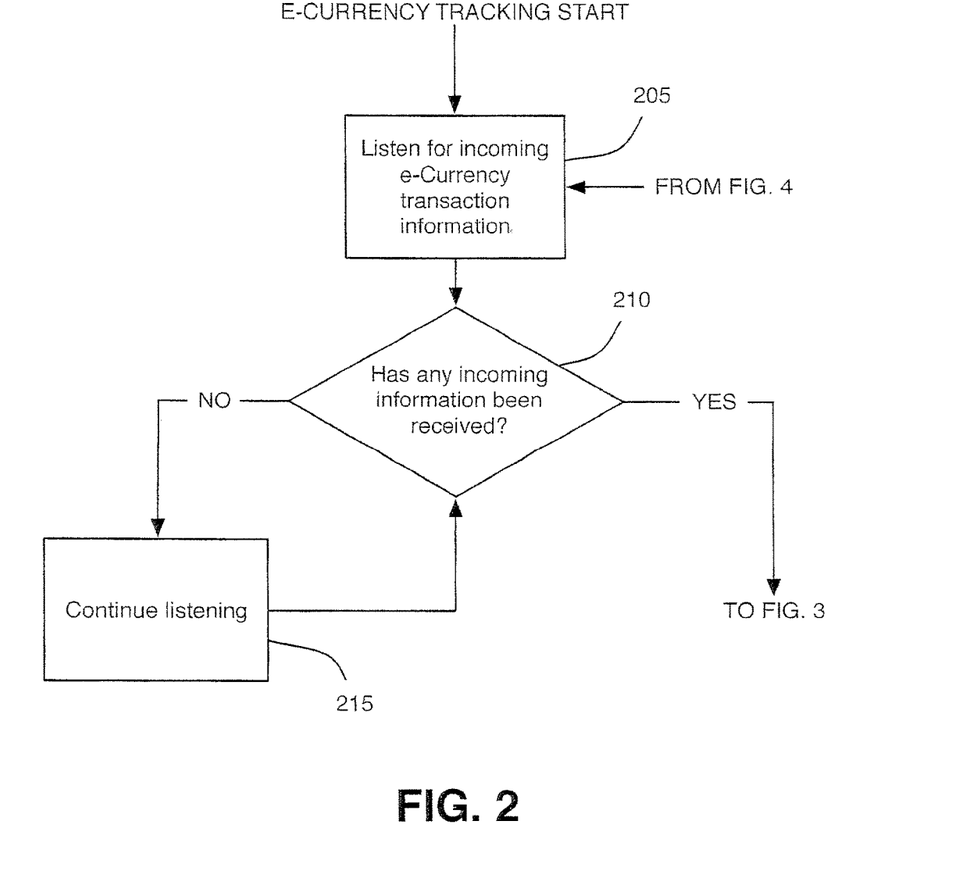
FIG. 2 illustrates an illustrative sequence of steps for implementing e-Currency tracking for the e-Currency Validation and Authorization Services Platform.
Figure 3:
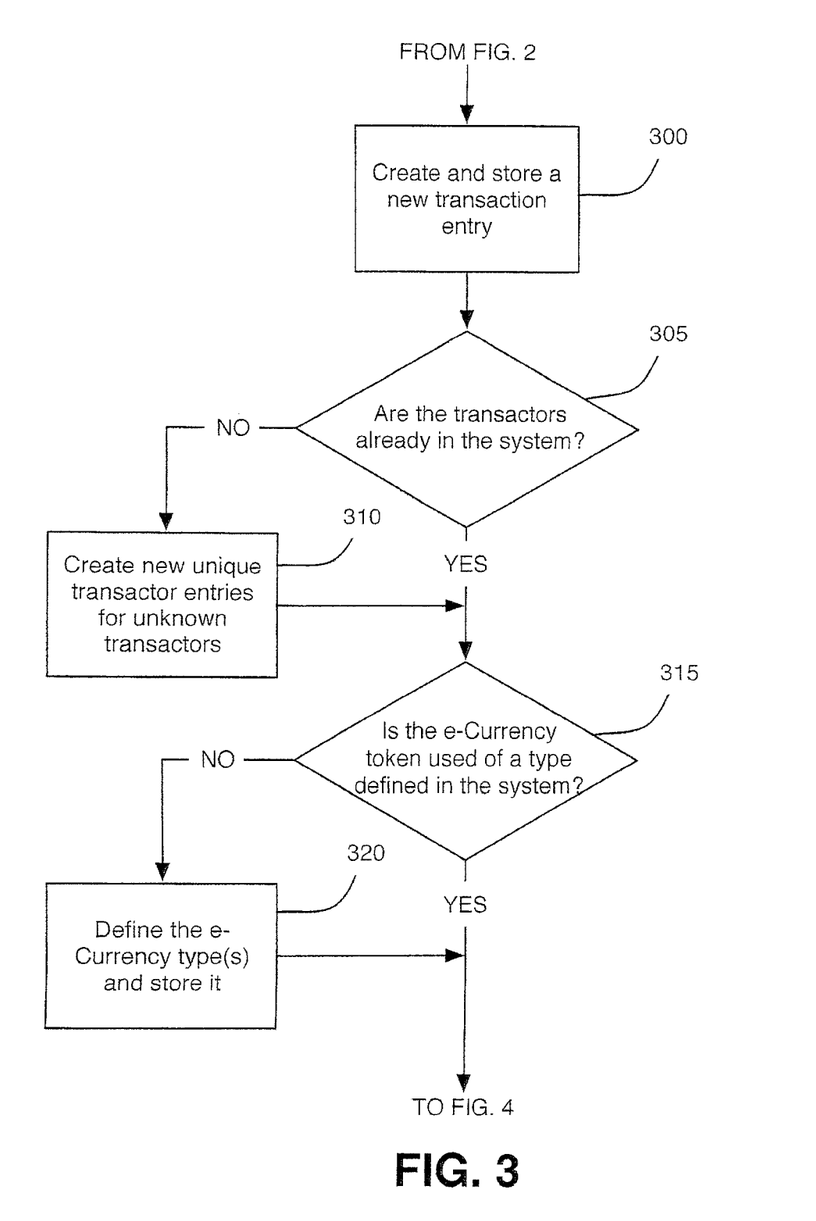
FIG. 3 illustrates a continuing sequence of steps for implementing e-Currency tracking for the e-Currency Validation and Authorization Services Platform.
Figure 4:
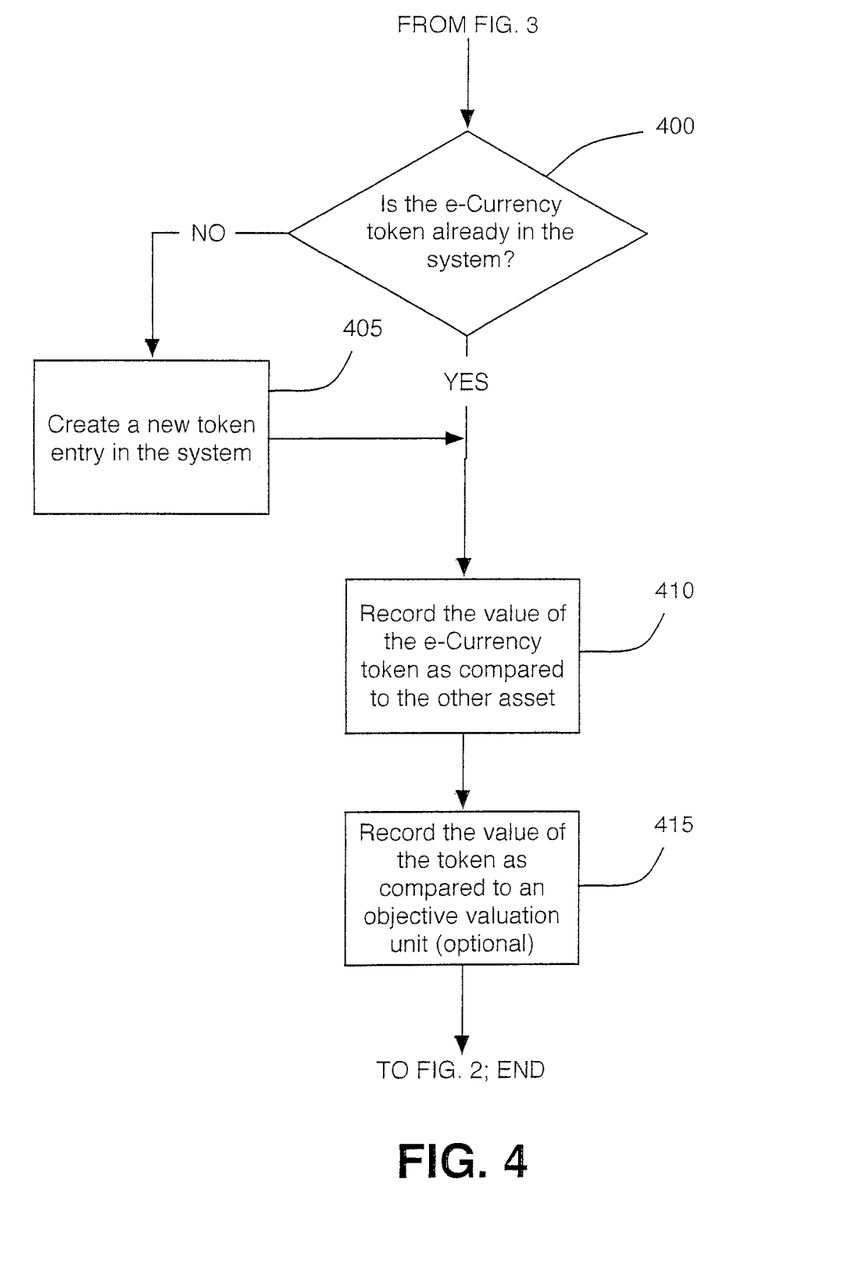
FIG. 4 illustrates a continuing sequence of steps for implementing e-Currency tracking for the e-Currency Validation and Authorization Services Platform.

FIGS. 2-4 illustrate an illustrative sequence of steps for implementing e-Currency tracking for an exemplary e-Currency Validation and Authorization Services Platform 100. The e-Currency Validation and Authorization Services Platform 100 preferably listens for incoming c-Currency transactions (step 205). Systems integrated with the e-Currency Validation and Authorization Services Platform 100 may automatically send a transaction notification to the e-Currency Validation and Authorization Services Platform 100 when they are involved in a transaction using e-Currency. For example, brick-and-mortar retailers may be subscribed to the e-Currency Validation and Authorization Services Platform 100, so that exchanges recorded on computerized registers automatically notify the e-Currency Validation and Authorization Services Platform 100 of exchanges involving e-Currency. Alternatively, subscribed users, such as the transactor 150 and 153, may manually notify the e-Currency Validation and Authorization Services Platform 100 of e-Currency transactions if they are conducting a transaction outside a subscribed retail location. For example, the e-Currency Validation and Authorization Services Platform 100 may utilize a mobile application that allows users to record transactions on the e-Currency Validation and Authorization Services Platform 100 via mobile smart phone. The e-Currency Validation and Authorization Services Platform 100 may regularly poll itself to determine whether any incoming transaction information has been received (step 210). If no information has been received, the e-Currency Validation and Authorization Services Platform 100 may continue polling (step 215). Once a transaction notification has been received, the sequence may progress to FIG. 3.

Referring to FIG. 3, once a transaction notification has been received, a new transaction entry may be created in the Transaction DB 170 and the information stored within (step 300). The e-Currency Validation and Authorization Services Platform 100 may then determine whether the transactors participating in the received transaction are known to the e-Currency Validation and Authorization Services Platform 100 (step 305). If they are not, then new unique transactor entries may be created in the Transactor DB 155 for each new unique transactor (step 310). If they are, or if the creation of the new transactor entries has been completed, then the e-Currency Validation and Authorization Services Platform 100 may determine whether the e-Currency token used in the transaction is of a type already defined or registered with the e-Currency Validation and Authorization Services Platform 100 (step 315). If it is not, then the type of the e-Currency token is preferably defined and stored within the e-Currency DB 160 (step 320).

Referring to FIG. 4, the e-Currency Validation and Authorization Services Platform 100 may determine whether the specific e-Currency token(s) has already been registered with the e-Currency Validation and Authorization Services Platform 100 (step 400). If it has not, then a new unique entry may be created for each token utilized in the transactions (step 405). If it has, or if the e-Currency Validation and Authorization Services Platform 100 has finished registering the new tokens, then the value of the e-Currency token(s) is preferably stored, as relative against the asset used in the transaction (step 410).

The e-Currency Validation and Authorization Services Platform 100 may optionally record the value of the e-Currency token as compared to an objective evaluation unit, which may be useful later for computational purposes (step 415). An objective evaluation unit may be a stable standard of value or reserve currency, such as a precious metal or a stable traditional currency. The use of an objective evaluation unit may greatly simplify relative comparison of disparate e-Currency types and assets. The e-Currency Validation and Authorization Services Platform 100 may then return to FIG. 2, step 205, and continue listening for new incoming transactions.

Other types of information may be recorded each time the e-Currency Validation and Authorization Services Platform 100 receives a notification that a transaction has taken place. For example, a point of origin, an originating entity, an initiating party, an origination location; an origination value, and a value as measured against a particular economic system may be recorded for the e-Currency token in question may be recorded for each transaction.

Therefore, for each transaction that is recorded, a new entry will be added (or created) for an e-Currency token. As information accumulates, a complete lifecycle history will be created for the particular e-Currency token. Tokens may subsequently be tracked against all lifetime/lifecycle history events back to their point of origin. This tracked data will therefore represent a "spend chain" of the token, and can be used to validate and authenticate the token. Tokens may therefore be assigned a veracity ranking, which will enable subscribing participants to make point-of-transaction decisions around acceptance of the offered token.

Figure 5:
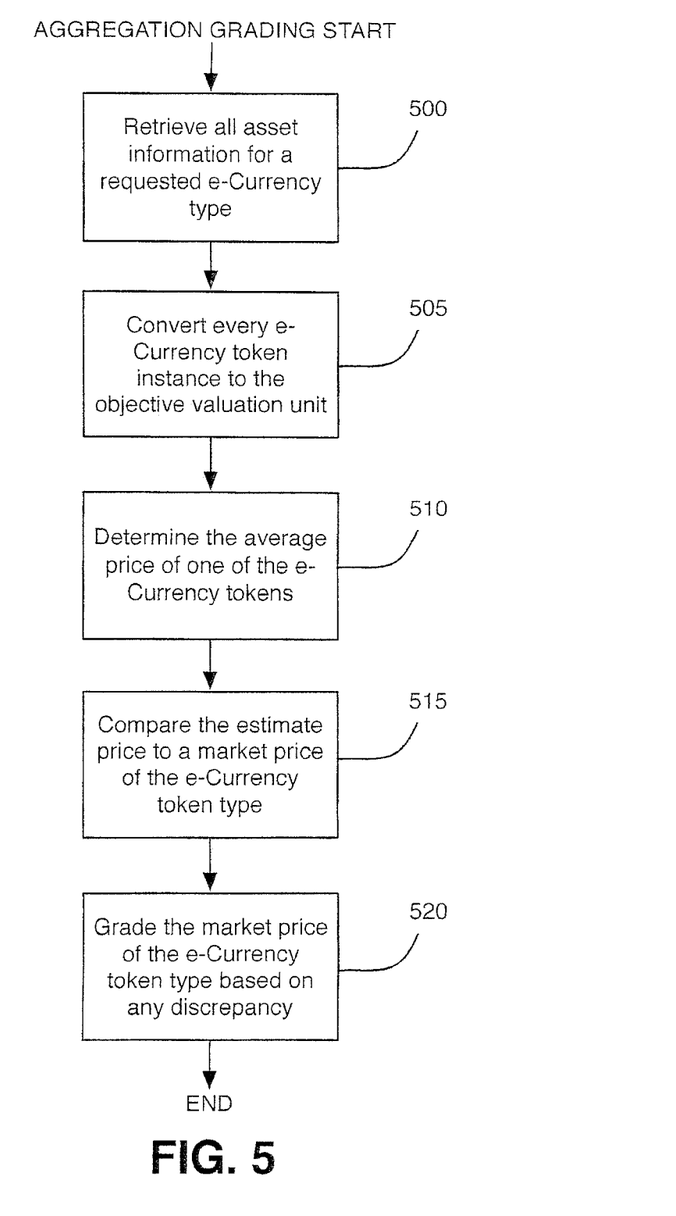
FIG. 5 illustrates a continuing sequence of steps for implementing aggregation grading for the e-Currency Validation and Authorization Services Platform.

FIG. 5 illustrates a continuing sequence of steps for implementing aggregation grading for the illustrative e-Currency Validation and Authorization Services Platform 100. As mentioned above, the e-Currency Validation and Authorization Services Platform 100 may perform an aggregation function to determine the accuracy of a quoted price for any particular e-Currency type. Many e-Currency types are available for sale for a given price. For example, Microsoft™ X-Box Live™ points and Facebook™ credits are purchasable with traditional currencies. It may be useful to consumers to know how much these e-Currencies are worth after the initial sale. Therefore, the e-Currency Validation and Authorization Services Platform 100 may generate an estimated price of each respective e-Currency type by aggregating transaction information of all e-Currency tokens of the desired e-Currency type, and then compare that estimated price to the quoted market price to determine the accuracy of the quoted price.

The e-Currency Validation and Authorization Services Platform 100 may first retrieve all asset information for the requested e-Currency type (step 500). If the e-Currency type asset information is in disparate monetary units (as it likely will be), the e-Currency Validation and Authorization Services Platform 100 may convert all asset information into a single monetary unit, such as the objective valuation unit (described above) (step 505). Subsequently, an estimated price of a single unit of the e-Currency type may be generated using a pre-selected algorithm (step 510). For example, the e-Currency Validation and Authorization Services Platform 100 may divide the sum of the assets by the number of e-Currency token instances to generate an estimated price per e-Currency token instance. The estimate may then be compared to a quoted market price of the e-Currency token type (step 515). A grade may then be generated using a grading algorithm (step 520).

Any desired algorithm may be utilized for this purpose. A simple algorithm may simply calculate a deviance between the estimated price and the quoted price. More complex financial estimates may be utilized as well, involving other types of data collected during the track process. For example, as will be described below, the reliability and veracity of a number of inputs (such as the transactors, the asset prices, etc.) may be further graded using the body of information contained in the e-Currency Validation and Authorization Services Platform 100. The grades assigned to these elements may affect the reliability of the estimate, which may in turn affect the estimated veracity of the quoted price. Any such algorithm or strategy may be utilized as desired.

Figure 6:
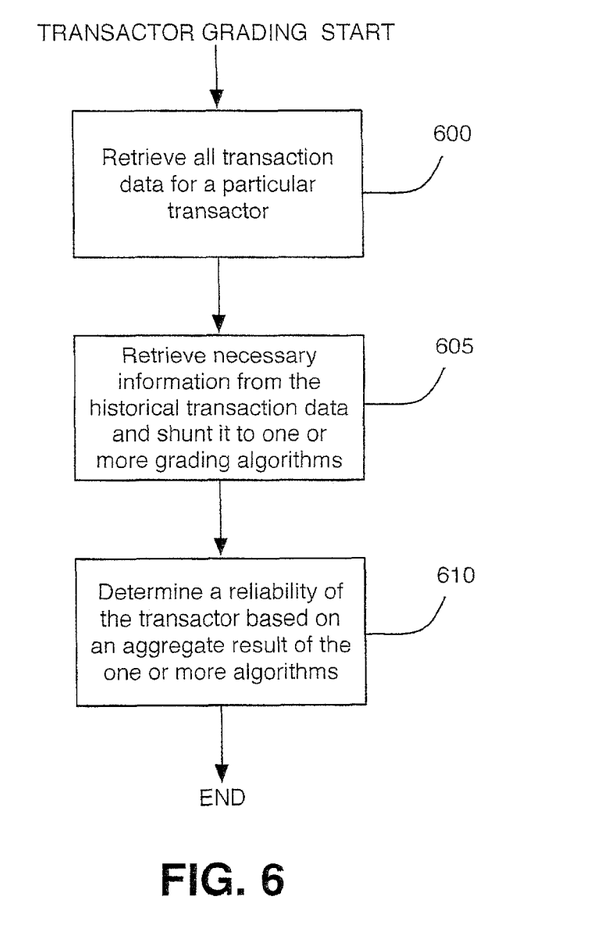
FIG. 6 illustrates a continuing sequence of steps for implementing transactor grading for the e-Currency Validation and Authorization Services Platform.

FIG. 6 illustrates a continuing sequence of steps for implementing transactor grading for the illustrative e-Currency Validation and Authorization Services Platform 100. As mentioned above, the reliability of a transactor may be graded by the e-Currency Validation and Authorization Services Platform 100. The transactor grade may affect subsequent grades given by the e-Currency Validation and Authorization Services Platform 100, such as the reliability or veracity of a quoted market price. For example, if a particular transactor has reported a large share of information for a particular e-Currency type, but the transactor has a history of poor or inaccurate reporting, then the estimate generated by the e-Currency Validation and Authorization Services Platform 100 will be poor. Therefore, the estimate should factor in the reliability of the transactor, which can be expressed as a grade.

The e-Currency Validation and Authorization Services Platform 100 may first retrieve all transaction data for a particular transactor (step 600). Subsequently, the relevant portions of transaction data may be shunted to one or more grading algorithms (step 605). The specific grading algorithms are widely available. They may consider, however, the transactor's transaction history, a past accuracy of asset/e-Currency reporting, any known background or historical information on the transactor (such as involvement in financial fraud, bankruptcy), etc. Results from the grading algorithms may be aggregated (again, based on a pre-selected algorithm) to determine a reliability of the transactor (step 610).

Figure 7:
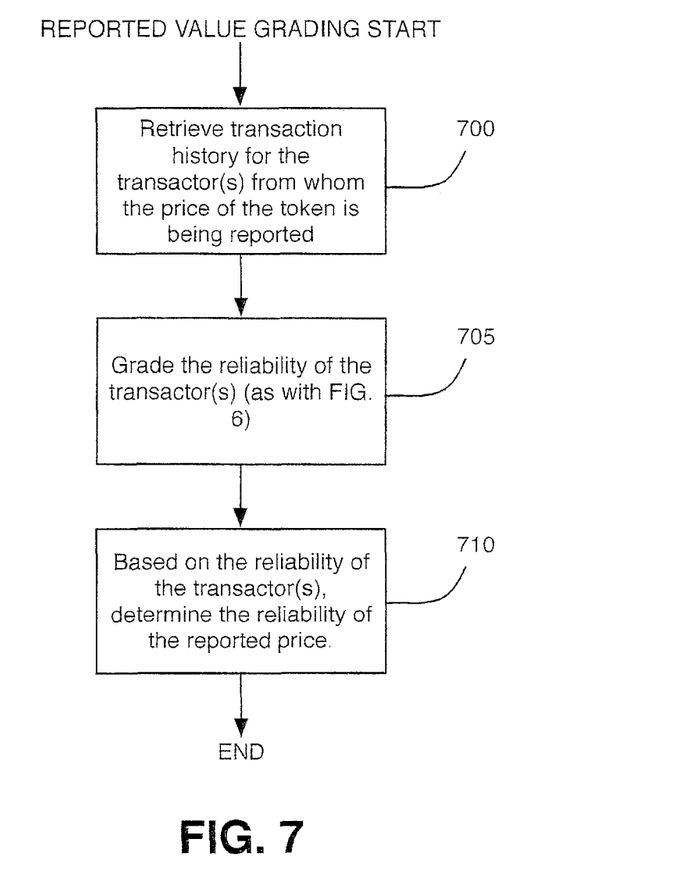
FIG. 7 illustrates a continuing sequence of steps for implementing individual price grading for the e-Currency Validation and Authorization Services Platform.

FIG. 7 illustrates a continuing sequence of steps for implementing reported value grading for the illustrative e-Currency Validation and Authorization Services Platform 100. As mentioned above, the reported value of each e-Currency token in terms of an asset may be subject to grading to determine the veracity of the reported value. This may be based on the grade of the transactor (described above with respect to FIG. 6). As with FIG. 6, transaction information for the transactor may be retrieved (step 700), and the reliability of the transactor graded (step 705). The grade of the transactor may then be used to estimate the reliability of the reported value of the e-Currency token (step 710). Again, algorithms for performing this task are available. For the sake of illustration, a simple algorithm may simply take an estimated reliability of a transactor and apply it to the reported value. Therefore, if a transactor has only 80% reliability, the reported value of the e-Currency token may be adjudged as 80% reliability as well. As with the above, other algorithms and strategies may be utilized as required.

Figure 8:
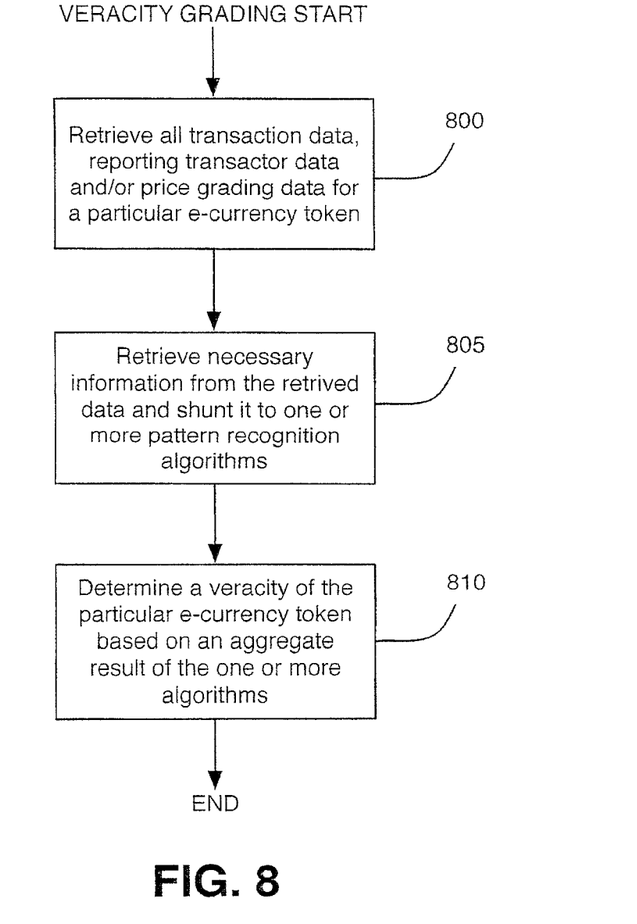
FIG. 8 illustrates a continuing sequence of steps for implementing veracity grading for the e-Currency Validation and Authorization Services Platform.

FIG. 8 illustrates a continuing sequence of steps for implementing veracity grading for the e-Currency Validation and Authorization Services Platform 100. Because e-Currency assets are all digital, there is a high potential for fraud, both in terms of the existence of the e-Currency tokens being used in the transaction, and in the transaction itself (which may be fraudulent or illegal). Because of the large body of information collected by the e-Currency Validation and Authorization Services Platform 100, the e-Currency Validation and Authorization Services Platform 100 is in a unique position to both verify the existence of the e-Currency token(s) and determine whether the transactions they were involved in were legitimate on a scaled basis. Historical, predictive and security-based analytics may be used to identify anomalous behavior. Historical, predictive and contextual data from the body of information may be used to score each transaction event.

When a user desires to verify a particular e-Currency token, the e-Currency Validation and Authorization Services Platform 100 may retrieve all transaction data, transactor data, grading data, etc. related to the e-Currency token (step 800). Subsequently, the appropriate data elements may be retrieved from the body of data and shunted to pattern recognition algorithms (step 805). The pattern recognition algorithms are generally beyond the scope of this disclosure, but may be designed to capture or recognize, for example, fraudulent transactions or falsified e-Currency tokens. The algorithm results may then indicate whether the particular e-Currency token is fraudulent or involved in a fraudulent transaction (step 810).

Figure 9:
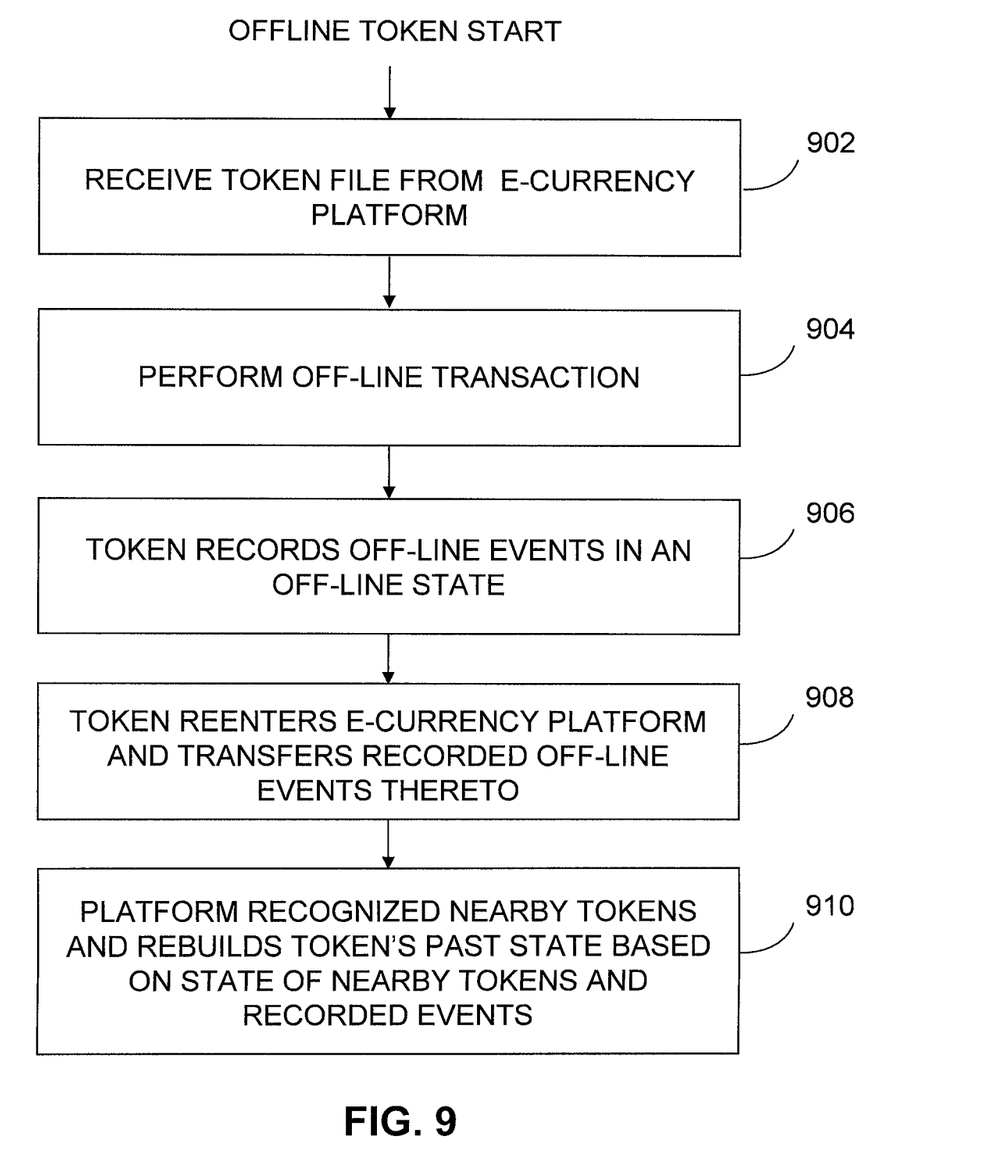
FIG. 9 is a flowchart depicting process steps performed in handling tokens involved in off-line transactions according to the present invention.

In FIG. 9, there is shown steps performed when making off-line transactions using a token from the e-Currency platform. In step 902, a token is received by a user by receiving its file from the e-Currency platform. One or more files are received by the user from Token Instances DB 165. As noted above, the token files may be received into a portable device, such as a thumb drive, portable hard drive, smart phone, cell phone, laptop, palmtop, or any other portable device.

The user performs an off-line transaction in step 904 using the token by using the files stored in the portable device. Any type of off-line transaction may be made, including, but not limited to, making a purchase, adding or withdrawing real currency to the token, investing all or part of the value of the token, or any other e-Currency transaction known in the art.

Details of the off-line transaction are recorded by the token into the portable device in step 906. The files received in step 902 may be modified to represent the off-line transaction or alternatively one or more additional files representing the off-line transaction may be added to the portable device in step 906.

As noted above, the token file received in step 902 may be received into a non-portable workstation which is capable of making off-line electronic transactions while not logged into the e-Commerce platform, without departing from the scope of the present invention.

In step 908, the token re-enters the e-Currency platform. The off-line events involving the token are transferred to the platform by transferring the token file recorded on the off-line device.

In step 910, the token needs to re-create its own past so it may be authenticated, validated, and rated by the platform. In particular the grading as described above in regard to FIG. 6 needs to take into account the off-line transaction. The e-Currency platform in step 910 recognizes other tokens associated with the re-appeared token (nearby tokens). For example, the tokens may share data within an environment of understood applied restrictions or service of privacy. The e-Commerce platform rebuilds the reappeared token's past state, including the off-line transaction by using the state of such nearby tokens and also using the recorded off-line events. Therefore, a veracity rating for the re-appeared token is fully supported so that users may critically assess and determine allowance, permission, or risk of transactions.

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention as defined by the appended claims.

What is claimed is:

1. A computer implemented method for handling a self-aware token, comprising the steps of:

receiving, on a memory device that is external to an e-Currency platform, a token file of a token from the e-Currency platform, said platform having a processor;

performing a transaction involving said token file, wherein the transaction is off-line with respect to the e-Currency platform;

in an off-line state with respect to the e-Currency platform, recording events of said off-line transaction in said token file on said memory device that is external to the e-Currency platform;

transferring the recorded events into said e-Currency platform; and using said processor, estimating by said e-Currency platform, a price value of said token based upon an average estimated price value of nearby tokens in said platform and the recorded events, wherein the nearby tokens are other tokens that are of a same e-Currency type of said token and are associated with said token as a function of sharing data within an environment that is selected from the group consisting of an applied restrictions environment and a service privacy environment.

2. The method of claim 1, wherein said memory device that is external to the e-Currency platform is a portable device that is selected from the group consisting of a thumb drive, a portable hard drive, a smart phone, a cell phone, a laptop and a palmtop.

3. The method of claim 1, wherein said memory device is a workstation.

4. The method of claim 1, wherein said token file is received from a token instance database in said platform.

5. The method of claim 1, wherein said off-line transaction takes place in a conventional brick and mortar store.

6. The method of claim 3, wherein said off-line transaction is performed using said workstation during a time when said workstation is not logged into said platform, and is selected from the group consisting of making a purchase, adding a real currency value to the token, withdrawing a real currency value from the token, and investing a part of a value of the token.

7. A system for handling a self-aware token comprising:
a computer processor;
and
a memory in circuit communication with the computer processor and containing program instructions, wherein the computer processor executes the program instructions and thereby defines an e-Currency platform and:
sends to a memory device that is external to the e-Currency platform a token file of a token from the e-Currency platform;
receives, after a period of time in which said memory device is off-line with respect to the e-Currency platform, a token file from said memory device, said token file having off-line transaction events recorded therein; and
estimates via said e-Currency platform a price value of said token based upon an average estimated price value of nearby tokens in said platform and the recorded events, wherein the nearby tokens are other tokens that are of a same e-Currency type of said token and are associated with said token as a function of sharing data within an environment that is selected from the group consisting of an applied restrictions environment and a service privacy environment.

8. The system of claim 7, wherein said memory device that is external to the e-Currency platform is a portable device that is selected from the group consisting of a thumb drive, a portable hard drive, a smart phone, a cell phone, a laptop and a palmtop.

9. The system of claim 7, wherein said memory device is a workstation.

10. The system of claim 7, wherein said token file is sent from a token instance database in said platform.

11. The system of claim 7, wherein said off-line transaction takes place in a conventional brick and mortar store.

12. The system of claim 9, wherein said off-line transaction is performed using said workstation during a time when said workstation is not logged into said platform, and is selected from the group consisting of making a purchase, adding a real currency value to the token, withdrawing a real currency value from the token, and investing a part of a value of the token.

13. The method of claim 1, further comprising:
   dividing a sum of asset values for the e-Currency type of said token by a number of e-Currency token instances to generate an estimated price per e-Currency token instance as the estimated price value for said token;
   comparing the estimated price per e-Currency token instance to a quoted market price of the e-Currency token type; and
   grading the estimated price value for said token as a function of a discrepancy between the compared estimated price per e-Currency token instance and quoted market price.

14. The system of claim 7, wherein the computer processor executes the program instructions and thereby:
   divides a sum of asset values for the e-Currency type of said token by a number of e-Currency token instances to generate an estimated price per e-Currency token instance as the estimated price value for said token;
   compares the estimated price per e-Currency token instance to a quoted market price of the e-Currency token type; and
   grades the estimated price value for said token as a function of a discrepancy between the compared estimated price per e-Currency token instance and quoted market price.

\* \* \* \* \*